United States Patent
Dalal et al.

(10) Patent No.: US 8,204,303 B2
(45) Date of Patent: Jun. 19, 2012

(54) SPATIALLY BASED TRANSFORMATION OF SPOT COLORS

(75) Inventors: Edul N. Dalal, Webster, NY (US); Patrick R. Harrington, Rochester, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 659 days.

(21) Appl. No.: 12/437,660

(22) Filed: May 8, 2009

(65) Prior Publication Data

US 2010/0284615 A1 Nov. 11, 2010

(51) Int. Cl.
*G06K 9/00* (2006.01)
*G06K 1/00* (2006.01)
*G06F 15/00* (2006.01)
(52) U.S. Cl. .......................................... 382/167; 358/1.9
(58) Field of Classification Search .................. None
See application file for complete search history.

(56) References Cited

U.S. PATENT DOCUMENTS

| 6,088,122 | A * | 7/2000 | Coleman ........................ 358/1.9 |
| 6,721,063 | B1 * | 4/2004 | Harrington .................... 358/1.9 |
| 6,760,056 | B2 | 7/2004 | Klassen et al. |
| 7,277,196 | B2 * | 10/2007 | Van de Capelle et al. ..... 358/1.9 |
| 7,295,215 | B2 | 11/2007 | Klassen |
| 7,965,414 | B2 * | 6/2011 | Wu et al. ........................ 358/1.9 |
| 2006/0077489 | A1 * | 4/2006 | Zhang et al. .................. 358/504 |
| 2006/0274337 | A1 * | 12/2006 | Dalal et al. .................... 358/1.9 |
| 2007/0035748 | A1 * | 2/2007 | Zhang et al. .................. 358/1.9 |

OTHER PUBLICATIONS

U.S. Appl. No. 12/358,806, filed Jan. 23, 2009, Dalal et al.

* cited by examiner

*Primary Examiner* — Yuzhen Ge
(74) *Attorney, Agent, or Firm* — Fay Sharpe LLP

(57) ABSTRACT

Colorant recipes for spot colors, or colors associated with vector graphic objects, are transformed to compensate for spatial variation in a rendering device. Inverted Jacobians of color production performance can be used to transform color deviations into colorant recipe changes. The colorant recipe changes are applied to original colorant recipes to provide the transformed colorant recipes. Jacobians can be determined by exercising a system model according to perturbations of the colorant recipes. Alternatively, test patches or strips based on perturbed original colorant recipes can be rendered and measured and the Jacobians can be based on such measurements. Alternatively, spatially dependent tone reproduction curves can be used to transform the colorant recipes associated with the vector graphic objects. Image processing systems can include a spatial variation information determiner, a spatial compensation information determiner and a colorant recipe transformer.

20 Claims, 3 Drawing Sheets

SPATIALLY BASED TRANSFORMATION OF SPOT COLORS

BACKGROUND

Presently disclosed embodiments are directed toward methods and systems for compensating spot color emulation colorant recipes for variations in print engine performance associated with spatial location within an image rendering space (e.g., location on a page) in a color producing system, process or engine.

In color producing systems or processes, such as, color printers, copiers, display devices, and the like, most requests for the production of colors are processed through a system profile. For example, the system profile includes a calibration curve or curves for transforming color descriptions of requested colors into colorant recipes based on the performance of the color producing system at the time of the system's most recent calibration. For instance, the system profile may provide information for transforming a requested color description in terms of an industry standard machine independent color space, such as that known as CIE1976 (L*a*b*) or CIELAB (of the Commission Internationale d'Eclairage), which describe color in terms of 3 parameters, known as L*, a*, b*, into colorant amounts. For example, many color producing systems produce colors by applying varying amounts of cyan, magenta, yellow and black colorants (e.g., inks, dyes, pigments, toners or combinations thereof) to a print medium (e.g., vellum or paper). Other color producing systems may employ additional colorants, such as orange, green, violet, light cyan, light magenta, and/or grey. Some color producing systems (e.g., display devices) produce colors by presenting various intensities of colored light (commonly red, green and blue). Colors produced through this transformation process are referred to as "process colors".

The system profile represents an average or assumed average or typical performance of the color producing system over the color or image rendering space of the color producing system.

Colors which are of particular importance to document or image authors are referred to as "spot colors". Spot colors can include colors associated with a company's logo, trademark or trade dress. Additionally, spot colors may be used when color accuracy is particularly important, such as when printing catalogs of clothing or decorative items or paint color selection guides.

Color producing systems that support the emulation of spot colors often include spot color tables, which associate spot colors, either by name or identification information, with a colorant recipe. Additionally, spot colors can be defined by parameter values in one or more industry standard machine independent color space (e.g., L*, a*, b*).

Traditionally, spot color tables have been generated manually through a process of trial, visual evaluation and adjustment. Since there are many spot colors in a table (over 1,000 in some cases), the generation and updating of a spot color table can be time consuming and expensive.

Recently, the inclusion of inline (in situ) spectrophotometers in high-end color producing systems has allowed the creation and maintenance of spot color tables to be at least semi-automated. However, the iterative trial and error process can still consume many sheets of print media, inks and/or toners (where the color producing system involves printing) as well as time. This would be further aggravated if spot color tables were generated on a spatial basis. That is, determining appropriate recipes for a particular spot color at a plurality of locations in image rendering space according to these trial-and-error processes would be prohibitively expense in both time and material. Nevertheless, color producing system performance can vary over an image rendering space.

Accordingly, there is a need for methods and systems for transforming or compensating spot color emulation according to spatial variation in color producing systems or processes (e.g., printers, displays, etc.).

BRIEF DESCRIPTION

A method for rendering an image described in a page description language, the image description including at least one vector graphic object each vector object being associated with a respective color and a respective original colorant recipe for emulating the respective color, wherein the method compensates for spatial variation in a color rendering performance of an associated rendering device, can include measuring the spatial variation in the color rendering performance of the associated rendering device related to rendering the color of the at least one selected vector graphic object, thereby generating spatial variation information associated with rendering the respective at least one respective color of the at least one selected vector graphic object, determining the original colorant recipe of at least one selected vector graphic object of the at least one vector object, determining at least one respective intended rendering location in image rendering space of the at least one selected vector graphic object, determining respective location specific compensation information for the at least one respective intended rendering location from the spatial variation information and the at least one respective intended rendering location, generating at least one respective transformed colorant recipe from the at least one respective original colorant recipe and the at least one respective location specific compensation information, replacing the respective original colorant recipe of the at least one selected vector graphic object with the at least one respective transformed colorant recipe, and rendering the image including the at least one selected vector graphic object and the associated at least one respective transformed colorant recipe at the at least one respective intended rendering location using the associated rendering device.

In some embodiments determining respective location specific compensation information for the at least one respective intended rendering location from the spatial variation information and the at least one respective intended rendering location can include determining a system model for the associated rendering device, wherein the system model relates colorant recipes to values in a device independent color space according to a sampled operation of the rendering device, estimating partial derivatives of aspects of the system model, the partial derivatives being obtained through a use of the system model at and/or near a point in the machine dependent color space associated with the at least one respective original colorant recipe, wherein the estimated partial derivatives describe changes in respective colorant amounts required to produce related changes in parameter values of the machine independent color space, according to the sampled operation of the rendering device, determining deviations in the color rendering performance of the associated rendering device, in terms of the machine independent color space, from a performance predicted by the system model based on the sampled operation and the measured colors at the plurality of locations in image rendering space and multiplying parameter values of the determined deviations by respective ones of the partial derivatives, thereby transforming the determined deviations into colorant recipe differences associated with the plurality of locations.

Alternatively, determining respective location specific compensation information for the at least one respective intended rendering location from the spatial variation information and the at least one respective intended rendering location can include rendering a plurality of test images with the associated rendering device based on test colorant recipes, the test colorant recipes being generated from respective perturbations of respective colorant amounts called for in respective original colorant recipe, the plurality of test images being rendered at least one selected location in image rendering space, the at least one location including locations known or later determined to be at, near and/or adjacent to the respective at least one intended location of the at least one selected vector graphic object, measuring perturbation colors of the plurality of test images using a color measurement device, thereby generating a plurality of measured perturbation colors associated with the plurality of locations, which comprise the spatial variation information, estimating partial derivatives of the performance of the associated rendering device for the color of the at least one selected vector graphic object at the at least one selected location, the partial derivatives being obtained from comparisons between respective combinations of color measurements associated with at least some of the at least one selected location, the respective combinations of color measurements being selected from the measured colors of the spatial variation information and respective ones of the measured perturbation colors, wherein the estimated partial derivatives describe changes in respective colorant amounts required to produce related changes in parameter values of the machine independent color space, determining at least one deviation in the color rendering performance of the associated rendering device, in terms of the machine independent color space, from a performance predicted by a system model and the respective measured colors at the at least one selected location in image rendering space and multiplying parameter values of the at least one determined deviation by respective ones of at least one respective selected set of estimated partial derivatives, thereby transforming the at least one determined deviation into a respective at least one colorant recipe difference associated with the at least one selected location.

In still other embodiments, determining respective location specific compensation information for the at least one respective intended rendering location from the spatial variation information and the at least one respective intended rendering location can include building a spatially dependent tone reproduction curve based on the spatial variation information, thereby generating the spatially dependent compensation information for each colorant separation associated with any respective original colorant recipe of the at least one selected vector graphic object.

An image processing system operative to provide directions for directing the rendering device to render an image described in a page description language, the image description including at least one vector graphic object, each vector graphic object being associated with a respective color and a respective original colorant recipe for emulating the respective color can include a spatial variation information determiner, a spatial compensation information determiner and a colorant recipe transformer.

For example, the spatial variation information determiner can be operative to control the associated rendering device to render a plurality of sets of test images, each respective set of test images being based on a respective test image colorant recipe, each test image of a respective set of test images being rendered at a plurality of locations in image rendering space. The spatial variation information determiner can be operative to receive color measurement and location information regarding color measurements made of the test images at the plurality of locations associated with each set of test images, the color measurements being made using a color measurement sensor and can be operative to process the received color measurement and location information to generate spatial variation information associated with rendering the color of at least a selected vector graphic object, of the at least one vector graphic object, with the associated rendering device.

The spatial compensation information determiner can be operative to generate spatially dependent compensation information associated with rendering the color of the at least one vector graphic object for the associated rendering device based on the spatial variation information associated with rendering the color of the at least one vector graphic object.

The colorant recipe transformer can be operative to determine location specific compensation information for the intended rendering location from the spatially dependent compensation information and the intended rendering location, can be operative to generate a respective transformed colorant recipe from the respective original colorant recipe and the location specific compensation information and can be operative to replace the respective original colorant recipe of the at least one vector graphic object with the respective transformed colorant recipe, thereby transforming the page description language file.

DETAILED DESCRIPTION

Figure 1:
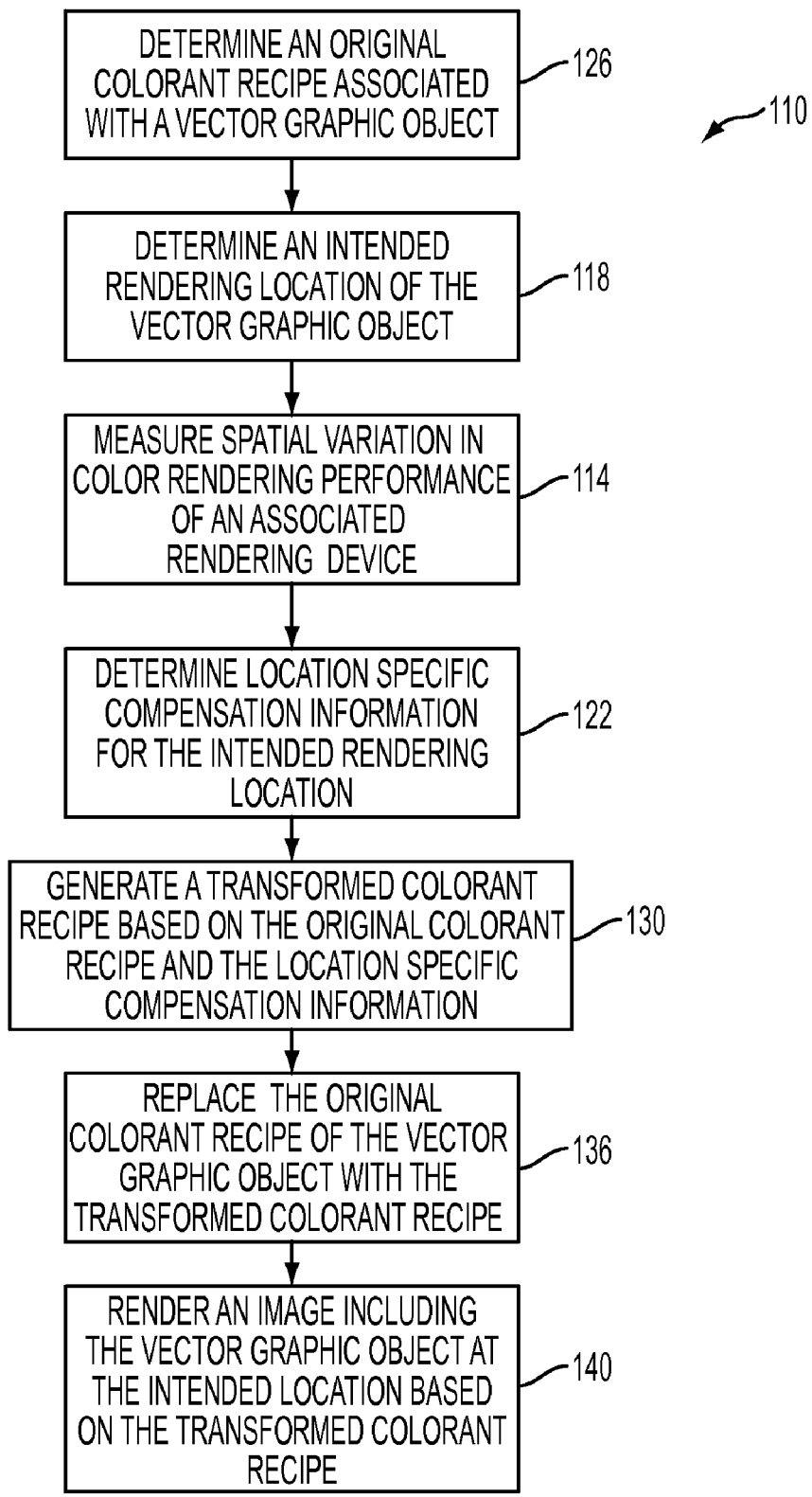
FIG. 1 is a flow chart outlining a method for rendering an image described in a page description language, the image description including at least one vector graphic object each vector object being associated with a respective color.
Figure 2:
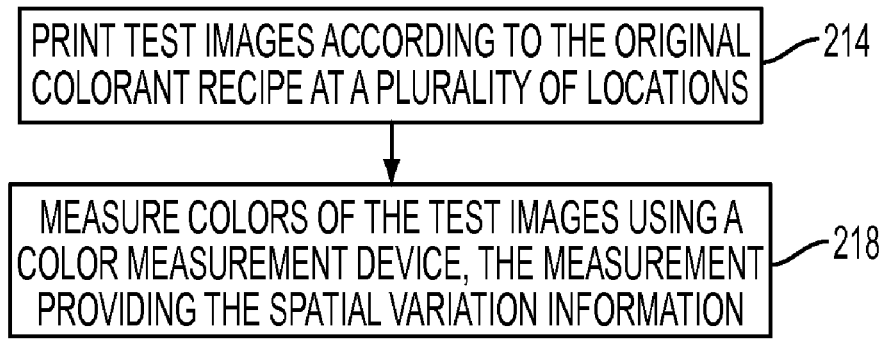
FIG. 2 and FIG. 3 are flow charts outlining aspects of particular embodiments of the method of FIG. 1.

Often, colors to be produced (such as spot colors) are called-out in code included, for example, in a file or entered into a color producing system via keyboard command or other operator interface. For example, a spot color may be called-out in a page description language (PDL). For instance, the color may be associated with a vector graphic object.

For example, the following is a snippet of PostScript® (PostScript is a registered trademark of Adobe Systems Inc.) code which would print a spot color (PANTONE® 171 C in this case) (Pantone is a trademark of Pantone, Inc.) in a rectangular 100×50 pixel vector graphic object, at two locations X,Y=(200,600) and (200,100) in image rendering space.

[/DeviceN [(PANTONE 171 C)]/DeviceCMYK {dup 0 mul exch dup 0.51 mul exch dup 0.69 mul exch 0 mul}] setcolorspace 1.0 setcolor
200 600 100 50 rectfill
200 100 100 50 rectfill When this code gets processed or interpreted, without application of the presently disclosed embodiments, the spot color call-out (e.g., Pantone 171C) accesses a corresponding spot color emulation colorant recipe obtained from a spot color table. For example, in a four colorant system having cyan, magenta, yellow and black colorants available, the original colorant recipe might call for colorant densities of CMYK=0%, 55%, 70%, 0%, respectively, regardless of location. Accordingly, without application of the presently disclosed embodiments, both the rectangular vector graphic objects would be rendered based on the same colorant recipe.

```
0 0.55 0.70 0 setcmykcolor
200 600 100 50 rectfill
200 100 100 50 rectfill
```

As indicated above, while the use of such spot color emulation recipes has accuracy advantages over process color processing, and while spot color processing has and continues to provide appropriate accuracy in many applications, as system performance improves and as the performance required in high end applications increases, what were once subtle variations in engine performance across an image rendering space (e.g., locations on a page or pages) can be or will become problematic. At the same time, the individual calibration or recipe determination for each individual spot color at a plurality of locations in image rendering space can be prohibitively expensive.

The presently disclosed embodiments address these issues by determining measures of the variation in color production performance and transforming or modifying spot color emulation colorant recipes to compensate for those determined variations. For example, by way of a simplistic example, measurements may indicate that a particular marking engine is producing colors that appear a bit more red on the left side of a page than in the center of the page. According to the presently disclosed embodiments, a spot color portion of a logo to be printed on the side of a page would be transformed to reduce the redness of the colorant recipe by a corresponding amount.

In some embodiments, this determination of a variation can be done on a general basis independent of a particular spot color and independent of a particular location. In other embodiments, the determination can be made on a job specific basis with measurements being directed toward the particular color or colors of interest and/or the particular location or locations of interest in image rendering space.

With reference to FIG. 1, generally, a method 110 for rendering an image described by a page description language, the image description including at least one vector graphic object associated with a respective color and at least one respective original colorant recipe for emulating the respective color can include measuring 114 spatial variation in color rendering performance of an associated rendering device, determining 118 an intended rendering location of a vector graphic object, determining 122 location specific compensation information for the intended rendering location, determining 126 an original colorant recipe associated with the vector object, generating 130 a transformed colorant recipe based on the original colorant recipe and the location specific compensation information, replacing 136 the original colorant recipe of the vector graphic object with the transformed colorant recipe and rendering 140 the image including the vector graphic object at the intended location based on the transformed colorant recipe.

As indicated above, in some embodiments, the measurement 114 of spatial variation is specific to the color or colors of interest. Accordingly, as depicted in FIG. 1, in those embodiments the determination 126 of the original colorant recipe (or recipes if more than one color is to be addressed) is made before the measurement 114.

In some such embodiments, the measurement 114 of spatial variation in the color rendering performance of the associated rendering device can include printing 214 test images according to the original colorant recipe at a plurality of locations and measuring 218 colors of the test images using a color measurement device. In such embodiments, the measurements provide the spatial variation information.

For example, where spatial variation is known or expected to exist or be most pronounced in a cross-process direction, printing 214 test images at a plurality of locations can include printing a color test strip or series of test patches in a cross-process direction (e.g., across a page). Where test patches are used, they may be spaced according to the desired accuracy and the characteristics of the associated rendering device. For example, it is anticipated that spacings of between 5 and 100 millimeters will provide adequate spatial resolution of spatial variation measurements in many systems. Additionally, it is anticipated that test patch dimensions or a test strip width of approximately 6 millimeters will generally be sufficient.

Measuring 218 the colors of the test images can include using a spectrophotometer to measure light from a standardized source reflected from the patches. In general, such spectrophotometers provide color measurements according to parameter values of a machine independent color space (e.g., $L^*a^*b^*$). Such measurements can be compared to a standard or intended measurement value associated with the original colorant recipe or spot color associated with the original colorant recipe, thereby providing a deviation from that standard at the position of each test image or measurement. That is, the measurements 218 are made by locating the measuring device at each test image or test location (if a single test strip is rendered and measured at various locations along the strip) or by leaving the measurement device at a fixed position and moving the rendered images to locate each one or portion of each one within the field of view of the color measurement device. For instance, the color measurements are recorded in association with measurement location information.

The measurements 218 and associated deviation determinations are made in terms of a three parameter machine independent color space (e.g. $L^*$, $a^*$, $b^*$). Since the associated rendering devices can often be based on a four or more colorant based, machine dependent color space, it is necessary to convert or transform the determined deviations or color differences into machine dependent colorant differences. That is, what is desired are respective colorant differences that can be applied to the original colorant recipe in order to generate respective transformed recipes which would compensate for the variations in color production of the associated rendering device and produce the desired color associated with the color of the vector graphic object at each of the locations for which measurements 218 were taken.

Figure 3:
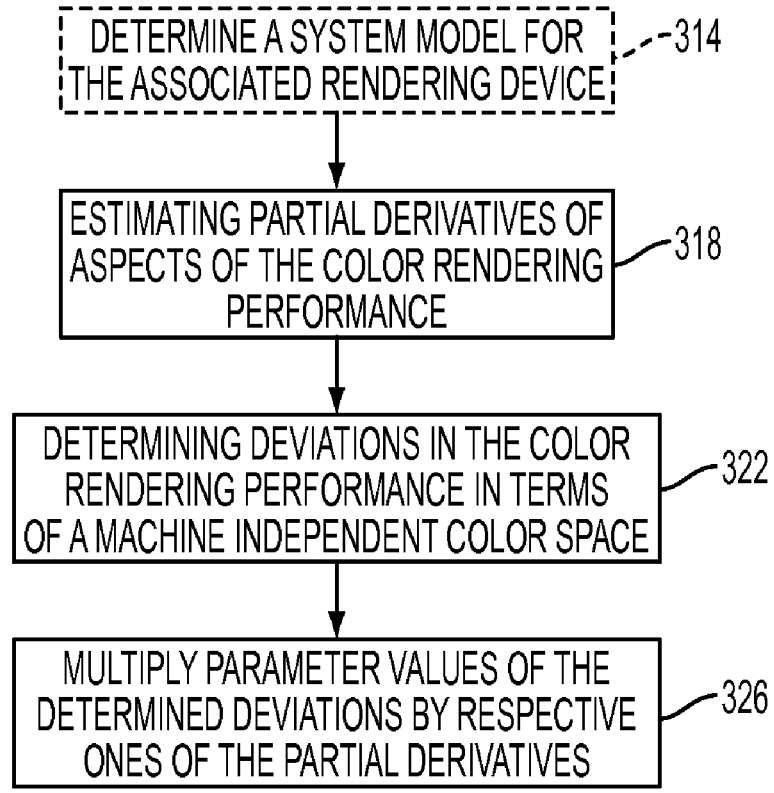
Figure 4:
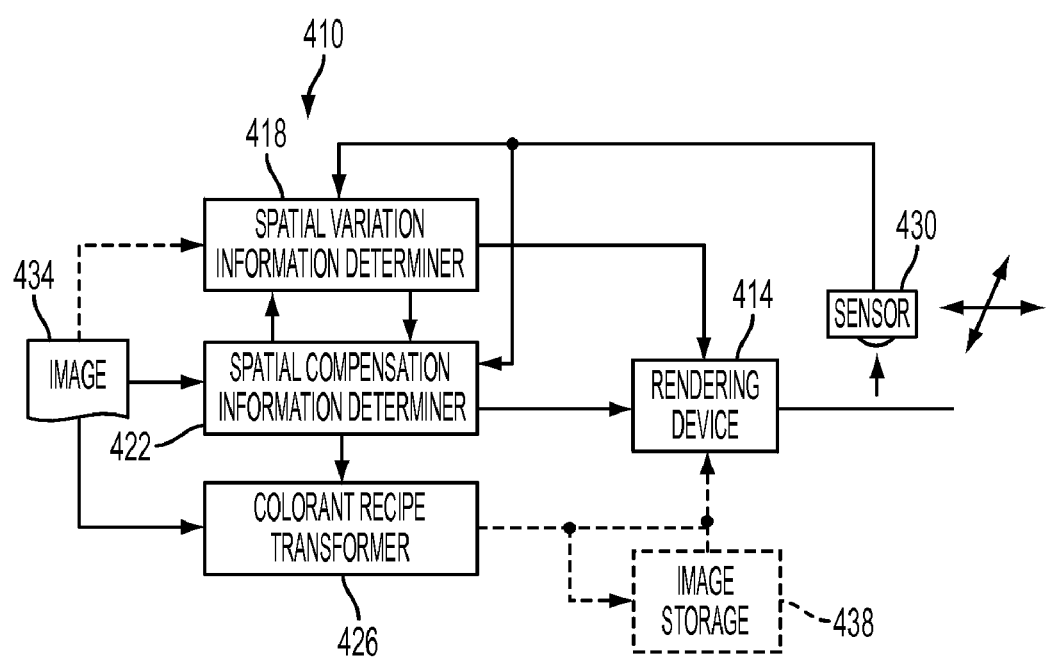
FIG. 4 is a block diagram of embodiments of systems operative to perform embodiments of the method of FIG. 1.

Accordingly, with reference to FIG. 3, in some embodiments, determining 122 location specific compensation information can include determining 314 a system model for the associated rendering device, estimating 318 partial derivatives of aspects of the color rendering performance of the associated rendering device (based on the system model in some embodiments), determining 322 the deviations (from the system model or other standard) in the color rendering performance in terms of the machine independent color space and multiplying 326 parameter values of the determined deviations by respective ones of the partial derivatives, thereby transforming the determined deviations into respective colorant recipe differences associated with the plurality of respective locations.

Once respective colorant recipe differences are determined for the associated plurality of respective locations, a colorant recipe difference associated with a location closest to the determined 118 intended rendering location of the vector graphic object (or objects) can be selected to be the determined 122 location specific compensation information for the intended rendering location. Alternatively, the location specific compensation information can be determined by interpolating between colorant recipe differences associated with respective locations of the plurality of locations that neighbor the intended rendering location or locations of the vector graphic object (or objects).

In many instances, the system model will have been previously determined for purposes of rendering process colors. Therefore, determining 314 the system model may mean simply accessing a previously determined model. However, if such a system model is not yet available, or is out of date, determining 314 the system model can include determining a system model that relates colorant recipes to values in the device independent color space according to the operation of the associated rendering device. Determining 314 the system model can include performing a standard system calibration.

For example, calibration color patches or test images are rendered according to known or selected colorant recipes. The patches are then measured. For example, a spectrophotometer measures light reflected from the patches and generates readings in terms of parameters of a machine independent color space (e.g., L*a*b*). The readings or measurements, or the output of models fitted to the readings or measurements are stored in association with the known or selected colorant recipes and form the basis of a system model of the associated rendering device.

As indicated above, the system model is used in rendering process colors. Accordingly, using the system model for the additional purpose of providing information for compensating for spatial variation does not represent an additional calibration burden and can reduce the testing or calibration burden associated with compensating spot color emulation colorant recipes for spatial variation in the associated rendering device. Accordingly, embodiments take advantage of the availability of the system model for various purposes.

For example, the transformation of a color difference into a colorant difference can be based on information included in the system models.

For instance, estimating 318 partial derivatives of the color rendering performance of the associated rendering device can include estimating partial derivatives obtained from, or based on, the system model. The estimated partial derivatives relate small changes in colorant amounts to changes in parameter values of the parameters of the machine independent color space. The transformation of the color difference into a colorant difference can further include multiplying respective parameter values of the color difference by appropriate respective ones of the estimated partial derivatives, thereby transforming the color difference into the colorant difference.

More particularly, the estimating can be of partial derivatives of respective colorant amounts with respect to selected parameter values of parameters in the machine independent color space, the partial derivatives being obtained through use of the system model at a plurality of points at and/or near a point in colorant space associated with the original spot color emulation colorant recipe. The partial derivatives describe small changes in respective colorant amounts required to produce related changes in the selected parameter values, assuming all other parameters of the machine independent color space are kept constant. The partial derivatives describe this relationship according to the operation of the color producing system as characterized by the system model.

Estimating 318 of the partial derivates can be achieved by applying the system model to a plurality of colorant recipes that represent small variations from the original colorant recipe. For example, processing an original spot color emulation colorant recipe denoted as $c_0$, $m_0$, $y_0$, $k_0$ through the system model may generate a color description represented by machine independent color description parameter values $L_0$, $a_0$, $b_0$. The model may be further exercised by processing recipes similar to $c_0$, $m_0$, $y_0$, $k_0$ to determine how small changes in that recipe cause changes in the parameters of the machine independent color description. One example of how this may be done is by changing $c_0$ to $c_0+\Delta c$, keeping $m_0$, $y_0$, and $k_0$ constant, processing those values through the model and noting the change in color $\Delta L$, $\Delta a$, $\Delta b$. The partial derivatives $$\frac{\partial L}{\partial c}, \frac{\partial a}{\partial c}, \frac{\partial b}{\partial c}$$

can then be estimated as:

$$\frac{\partial L}{\partial c} \approx \frac{\Delta L}{\Delta c}, \frac{\partial a}{\partial c} \approx \frac{\Delta a}{\Delta c}, \frac{\partial b}{\partial c} \approx \frac{\Delta b}{\Delta c}.$$

Partial derivatives related to the other colorants can be similarly estimated by perturbing $m_0$, $y_0$, $k_0$ with $\Delta m$, $\Delta y$ and $\Delta k$ in a manner similar to the perturbation of $c_0$ with $\Delta c$ described above. The perturbations ($\Delta c$, $\Delta m$, $\Delta y$, $\Delta k$) can be positive or negative and can be suitably chosen, for example, to avoid gamut boundaries (i.e., colorant values that are beyond the capability of the color producing system).

As a matter of convenience, such partial derivatives or estimates thereof can be arranged in what is known as a Jacobian matrix or Jacobian J, wherein:

$$J = \begin{bmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{bmatrix}$$

While Jacobian matrices are used to organize partial derivatives in many fields, as defined hereinabove, the Jacobain J relates aspects of a color difference to colorant differences. For instance, a color difference dL, da, db associated with a colorant difference dc, dm, dy, dk can be found from:

$$\begin{bmatrix} dL \\ da \\ db \end{bmatrix} = J \cdot \begin{bmatrix} dc \\ dm \\ dy \\ dk \end{bmatrix}$$

However, according to embodiments described herein, there is a need to calculate a colorant difference from a determined color difference. To do this, we need an inverted form of the Jacobian J. Such a transformation of a color difference into a colorant difference can be achieved through the multiplication 326 of the determined deviations (e.g., dL, da, db)

by respective ones of the partial derivatives (S), which can be denoted as:

$$\begin{bmatrix} dc \\ dm \\ dy \\ dk \end{bmatrix} = S \cdot \begin{bmatrix} dL \\ da \\ db \end{bmatrix},$$

where S is the inverse of J.

While the Jacobian J can be unambiguously calculated, there are multiple solutions to inverting J, since in our application, J is typically not a square matrix. For example, in printing applications, J is typically not a square matrix because the number of colorants (e.g., 4 or more) is usually greater than the number of parameters or color dimensions in the machine independent color space (e.g., 3). Of the multiple solutions to inverting J, the preferred solutions are those in which the relationships between the colorant values are close to the relationships that exist in the initial or original spot color emulation recipe. Those solutions to the inversion of the Jacobian in which relationships between the colorant values are not close to the relationships that exist in the original recipe will yield the desired color but they may differ from the original recipe in other attributes, which might effect smoothness, stability, etc. The preferred solutions can be found by imposing suitable constraints, or some form of selection criteria, on the inversion process. For instance, a cost function can be used to evaluate or select from among the various solutions to the Jacobian inversion. The selection is made by minimizing a "cost". That is, a cost function is minimized For example, in some embodiments, the cost function that is minimized is a change, relative to the initial spot color emulation colorant recipe, in the ratio of a function of one or more colorants to at least one of the remaining colorants. For instance, this cost function can be minimized through a search and select method. For example, a search is performed for all possible colorant differences (dc, dm, dy, dk) that give the desired color difference (dL, da, db). Many numerical search methods are known that can be applied to this task. For example, the so-called Steepest Descent method, conjugate Gradient algorithm and Quasi-Newton methods can be used. Furthermore, a brute-force search method, which searches a grid of all possible (dc, dm, dy, dk) around the initial spot color emulation colorant recipe $c_0$, $m_0$, $y_0$, $k_0$, checks if they give the desired color difference (dL, da, db) and identifies all (dc, dm, dy, dk) that give the desired color difference.

Once all possible solutions are determined, one can be selected based on a variety of constraints or criteria. As indicated above, a constraint that can be applied is one that preserves relationships between colorant values. For instance, after finding all possible solutions, a colorant ratio change $\delta R$ for each solution can be found. One example of a colorant ratio change is given by:

$$\delta R = \left| \frac{\min(c_0 + dc, m_0 + dm, y_0 + dy)}{k_0 + dk} - \frac{\min(c_0, m_0, y_0)}{k_0} \right|$$

When $k_0$ is greater than a threshold value $\eta$, the solution that minimizes $\delta R$ identifies the selected solution to the inversion of the Jacobian and parameters therefrom can be used in the multiplication 326 operation. To avoid numerical instabilities, when $k_0$ is less than or equal to $\eta$, the solution that minimizes dk identifies the selected solution.

The numerical methods described above can be computationally complex and therefore expensive. However, by loosening these constraints a little, analytical inversion methods are possible, enabling significant computational simplification.

For example, in some embodiments, a minimal Euclidian distance criterion is applied. The minimal Euclidian distance criterion minimizes a sum of changes (relative to the initial spot color emulation colorant recipe) in amounts of all the colorants (e.g., $dc^2+dm^2+dy^2+dk^2$). By minimizing the sum of changes in colorants, the relationships between the colorant values are approximately preserved, for small changes in printer characteristics.

Under this criterion, the inversion of J reduces to a well-known analytical matrix inversion called pseudo-inverse. That is, S, the inverse of J, is given by $S=(J^tJ)^{-1}J^t$ where $J^t$ is the transpose of J, $J^tJ$ is a non-singular (e.g., 4×4) matrix, and $(J^tJ)^{-1}$ refers to the standard matrix inversion of the square matrix $J^tJ$.

In some embodiments, the cost function that is minimized is the amount of change in a selected colorant. That is, such a colorant preserving criterion preserves the use of one of the colorants (typically black (k)) called for in the original or initial spot color emulation colorant recipe (e.g., $k_1=k_0$). For small changes in printer or rendering device characteristics, keeping one of the colorants at a constant value (or nearly constant value), approximately preserves the relationships between the colorant values. With zero change in one of the colorants, the Jacobian is given by a 3×3 sub-matrix. For example, with black (k) preserved, the sub-matrix becomes:

$$J_1 = \begin{bmatrix} \frac{\partial L}{\partial c} & \frac{\partial L}{\partial m} & \frac{\partial L}{\partial y} \\ \frac{\partial a}{\partial c} & \frac{\partial a}{\partial m} & \frac{\partial a}{\partial y} \\ \frac{\partial b}{\partial c} & \frac{\partial b}{\partial m} & \frac{\partial b}{\partial y} \end{bmatrix}$$

Since $J_1$ is a square matrix, its inverse $S_1 \equiv J_1^{-1}$ can be readily calculated analytically using standard matrix inversion. Once $S_1$ is determined, color differences can be converted to colorant differences using, for example, $$\begin{bmatrix} dc \\ dm \\ dy \end{bmatrix} = S_1 \cdot \begin{bmatrix} dL \\ da \\ db \end{bmatrix}.$$

When applying the k preserving constraint as discussed above, there may not always be a solution, since in some cases the sub-matrix may be singular (i.e., no inverse exists). Moreover, even when solutions exist, in some cases they may be outside the valid range. Physically, these cases correspond to solutions that are out of gamut. In such cases, an inverse may be found by setting $k_1=k_0+\Delta k$ rather than $k_1=k_0$. $\Delta k$ may be positive or negative. The smallest possible value of $\Delta k$ which permits the inversion should be used, and this can be determined by, for example, an iterative process.

In some embodiments, colorant preservation is extended or applied to other colorants (e.g., cyan (c)-preserving). However, k-preserving solutions are more likely to exist, since use of k can often be replaced with the use of c, m, and y.

Since color producing systems are typically nonlinear, it may be necessary to iteratively determine the Jacobian and update the calculation.

In some applications, there may be a desire to achieve greater accuracy than that which can be achieved by estimating 318 derivatives of the color rendering performance from the system profile. The system profile accuracy may be limited due to interpolation and fitting errors, drift that can occur over time and other factors. Additionally, the system profile is traditionally not spatially dependent. Higher accuracy can be achieved by directly measuring the parameters of the Jacobian instead of determining them by exercising the system model.

Accordingly, in some embodiments or applications, estimating 318 the partial derivatives of aspects of the color rendering performance can include rendering a plurality of test images with the associated rendering device based on test colorant recipes. For instance, the test colorant recipes can be generated from respective perturbations of or from respective colorant amounts called for in the original colorant recipe of the vector graphic object. Since what is of interest are the color rendering process characteristics at the location in image rendering space where the vector graphic object is to be printed, at least some of the test images should be rendered at and/or adjacent to the intended rendering location of the vector graphic object. For example, if the intended rendering location for the vector graphic object is 5 centimeters from a left edge of a display or sheet of print media (e.g., paper), then at least some of the test images should be rendered at positions that are at, near or adjacent to a point 5 centimeters from the left edge.

In embodiments or applications wherein the specifics of a particular job, and therefore a particular vector graphic object are known, the rendering of test images can be limited to rendering of test images at or near the determined 118 intended rendering location of the vector graphic object.

However, in some embodiments, the estimation 318 of partial derivatives may be done on a regular basis independent of any particular job. In such embodiments or applications, test images are rendered throughout image rendering space or along one or more paths of anticipated variation therein, thereby assuring that wherever the intended rendering location of a vector graphic object may be in image rendering space, test images have been rendered at and/or near or adjacent to that intended rendering location.

In embodiments or applications wherein the rendering device is a printer or marking engine, it may be necessary to render the test images over several sheets of print media (e.g., paper, vellum, etc.). While the test images are printed at corresponding locations on respective sheets of print media, it is to be understood that the actual vector graphic object may be printed on a sheet or sheets which are separate from those upon which the test images are printed or rendered.

The colors of the test images (i.e., perturbation colors) are measured in a manner similar to that described with regard to the measurement 114 of spatial variation information from color patches or strips. Such measurements result in the generation of a plurality of measured perturbation colors associated with a respective plurality of locations.

In embodiments that estimate 318 partial derivatives of the color producing process based on perturbation measurement, the partial derivates can be obtained from comparison of measurements. For instance, the perturbations of the test images can be small variations from the original colorant recipe. For example, an original spot color emulation colorant recipe denoted as $c_0$, $m_0$, $y_0$, $k_0$ may be associated with machine independent color space measurement having parameter values $L_0$, $a_0$, $b_0$. Test images may be rendered according to recipes similar to $c_0$, $m_0$, $y_0$, $k_0$ to determine how small changes in that recipe cause changes in the measurements of parameters of the machine independent color space. One example of how this may be done is by changing $c_0$ to $c_0 + \Delta c$, keeping $m_0$, $y_0$, and $k_0$ constant, printing a test image at and/or near or adjacent to the intended rendering location of the vector graphic object, measuring the color of the test image and noting the change in measured color $\Delta L$, $\Delta a$, $\Delta b$. Partial derivatives $$\frac{\partial L}{\partial c}, \frac{\partial a}{\partial c}, \frac{\partial b}{\partial c}$$

can then be estimated as:

$$\frac{\partial L}{\partial c} \approx \frac{\Delta L}{\Delta c}, \frac{\partial a}{\partial c} \approx \frac{\Delta a}{\Delta c}, \frac{\partial b}{\partial c} \approx \frac{\Delta b}{\Delta c}.$$

Partial derivatives related to the other colorants can be similarly estimated by perturbing $m_0$, $y_0$, $k_0$ with $\Delta m$, $\Delta y$ and $\Delta k$ in a manner similar to the perturbation of $c_0$ with $\Delta c$ described above. The perturbations ($\Delta c$, $\Delta m$, $\Delta y$, $\Delta k$) can be positive or negative and can be suitably chosen, for example, to avoid gamut boundaries (i.e., colorant values that are beyond the capability of the color producing system).

As indicated above, such partial derivatives or estimates thereof can be arranged in what is known as a Jacobian matrix or Jacobian J, wherein:

$$J = \begin{bmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{bmatrix}.$$

While Jacobian matrices are used to organize partial derivatives in many fields, as defined hereinabove, the Jacobain J relates aspects of a color difference to colorant differences. For instance, a color difference dL, da, db associated with a colorant difference dc, dm, dy, dk can be found from:

$$\begin{bmatrix} dL \\ da \\ db \end{bmatrix} = J \cdot \begin{bmatrix} dc \\ dm \\ dy \\ dk \end{bmatrix}$$

However, according to the embodiments discussed herein, there is a need to calculate a colorant difference from color differences. To do this, we need an inverted form of the Jacobian J. Such a transformation of a color difference into a colorant difference is denoted as:

$$\begin{bmatrix} dc \\ dm \\ dy \\ dk \end{bmatrix} = S \cdot \begin{bmatrix} dL \\ da \\ db \end{bmatrix},$$

where S is the inverse of J.

As indicated above, the partial derivatives can be estimated 318 based on a comparison of the color measurements associated with the measurement 114 of spatial variation. Alternatively, the partial derivatives can be estimated 318 based on a comparison of respective perturbation measurements. For example, perturbation measurements associated with a positive perturbation and a negative perturbation in a colorant amount (e.g., +ΔC and −ΔC). A still further alternative is to compare the color measurements to colors predicted to be produced according to the determined 314 system model.

It is noted that in embodiments which rely on measurements for estimating aspects of the color rendering performance, the determination 314 of the system model is optional. For example, the determination 314 of the system model is only necessary in these embodiments if the model is needed to provide one or more standards against which perturbation measurements are to be compared.

As indicated above, while the Jacobian J can be unambiguously calculated, there are multiple solutions to inverting J. Accordingly, some method for selecting an appropriate inversion solution can be applied as described above.

Once the estimated 318 partial derivatives are in the appropriate form, the rest of the determination 122 of the location specific compensation information can proceed as described above. At least one deviation in color rendering performance of the associated rendering device is determined in terms of the machine independent color space. For example, the deviation in performance is determined from a difference between a performance predicted by a system model and colors measured at or near the intended rendering location in image rendering space. A multiplication can then be performed wherein parameter values of the determined deviation (e.g., dL, da, db) can be multiplied by respective ones of at least one respective selected estimated partial derivatives:

$$\begin{bmatrix} dc \\ dm \\ dy \\ dk \end{bmatrix} = S \cdot \begin{bmatrix} dL \\ da \\ db \end{bmatrix},$$

where S is the inverse of J,
thereby transforming the determined at least one deviation into a respective at least one colorant recipe difference associated with the intended rendering location.

As indicated above, in some embodiments or applications, partial derivative estimates may be determined for a plurality of locations and/or for a plurality of colors. For example, spatial variation compensation information may be collected on a regular basis prior to the identification of a particular job. Accordingly, perturbations are applied to one or more original color emulation recipes and test images are printed at locations throughout image rendering space or throughout a region of image rendering space suspected of color production variation. For example, where a rendering device is suspected to exhibit spatial variation in an X direction and is known to produce colors consistently for any given location in the X direction as position changes in a Y direction, perturbation images can be rendered and measured in association with various X positions, without concern for their position in the Y direction.

Additionally, in some embodiments, it may be desirable to smooth or average partial derivative estimates with partial derivative estimates determined for neighboring locations. Accordingly, perturbation test images may be printed at a predetermined intended rendering location of a vector graphic object and at points neighboring that location so that, for example, estimates determined from measurements made at the intended rendering location can be smoothed or filtered according to, for example, a weighted average of estimated partial differential parameter associated with neighboring locations.

Accordingly, measurement data, estimated partial differential parameter information and/or colorant recipe difference information may be stored in association with image space location information for later access or selection.

For example, in some embodiments, colorant recipe difference information is stored and a selection is made from that stored information. For instance, the colorant recipe difference information associated with a location that is closest (from among the other locations for which colorant recipe difference information is stored) to the intended rendering location of the vector graphic object is selected to be the determined 122 location specific compensation information.

In some other embodiments or applications, a plurality of colorant recipe differences associated with positions neighboring the intended rendering location are identified and accessed. An interpolation is performed based on the relative positions associated with the accessed colorant recipe differences with regard to the position of the intended rendering location. In these embodiments, the interpolation provides an interpolated colorant recipe difference that is the location specific compensation information.

Transformed colorant recipe information can be generated 130 by combining values of the original colorant recipe with respective values of the location specific compensation information. For example, respective values of the colorant recipe difference (e.g., ΔC, ΔM, ΔY, ΔK) can be added to respective values from the original colorant recipe (e.g., $C_o$, $M_o$, $Y_o$, $K_o$).

In other embodiments which do not require prior knowledge of the intended rendering location or of the color of the vector graphic object, measuring 114 spatial variation information can include printing or displaying single colorant or color strips or patches at a plurality of locations. For example, where the rendering device is a printer, for each colorant separation associated with the original colorant recipe of the color of the vector graphic object, test images are rendered based on selected area coverage values of the individual colorants. Test images based on each selected area coverage value are rendered at a plurality of locations in the image rendering space. For instance, cyan test patches based on a 50 percent area coverage may be printed at a plurality of locations along a path of suspected color production variation. Additionally, cyan test patches based on other area coverages may be printed at the same or similar locations along the same or similar paths. Similar test patches or images are printed for other colorants (e.g., magenta, yellow, black and other colorants). The colors or densities of the resulting rendered test images are measured using a sensing device. For instance, a densitometer or a spectrophotometer can be used to measure 114, for each colorant and for each location of the plurality of locations, a resulting colorant density or colorant combination, these color or density measurements comprise the spatial variation information.

In such embodiments, determining 122 location specific compensation information for the intended rendering location (which may as yet be undetermined) can include building a spatially dependent tone reproduction curve for each colorant separation that might be associated with any original colorant recipe of any yet to be determined vector graphic object. For each particular location for which colorant densities or colors are measured, a tone reproduction curve can be built based on those measurements. For instance, a look-up table relating the colorant densities upon which a test image or strip was rendered and the actual measured densities or colors can be built. Alternatively, a curve fitting equation based on such relationships can be determined. Such tables or equations are considered tone reproduction curves for that location. Additional such tone reproduction curves can be determined for the other locations. In combination, the tone reproduction curves for all the measured locations comprise a spatially dependent tone reproduction curve.

In such embodiments, generating 130 the transformed colorant recipe can include processing each of the colorant or area coverage values associated with the colorants of the original colorant recipe through the spatially dependent tone reproduction curve associated with that colorant. For example, for each colorant, a tone reproduction curve that is associated with a position that is closest to the intended rendering location of a vector graphic object is selected and used to transform the corresponding colorant value of the original colorant recipe. Additional colorants of the original colorant recipe can be processed in a similar manner, thereby generating 130 the transformed colorant recipe based on the original colorant recipe and the location specific compensation information.

Alternatively, interpolation may be used to generate 130 the transformed colorant recipe.

For instance, if an intended rendering location of a vector graphic object is between the locations associated with two or more portions of the spatially dependent tone reproduction curve, then the individual colorant values of the colorant recipe may be transformed according to a weighted combination of the tone reproduction curve portions. For example, the weights applied control the influence of each portion of the spatially dependent tone reproduction curve. For example, a portion of the spatially dependent tone reproduction curve associated with a position that is closest to the intended rendering location of the vector graphic object may be weighted to have a stronger influence on the transformation of the colorant value than might a tone reproduction curve associated with a location that is relatively further from the location of the intended rendering location.

In all embodiments, the original colorant recipe can be replaced 136 with the transformed colorant recipe. In embodiments or applications wherein an image includes more than one vector graphic object, selected portions of the method 110 can be repeated until all of the desired or selected colors of the selected vector graphic objects have had transformed colorant recipes generated 130 and available to replace 136 the original colorant recipe. In embodiments where the measurements 114 of spatial variation and the determinations 122 of location specific compensation information are performed without knowledge of the particular locations and/or colors associated with the selected vector graphic objects, those procedures need not be repeated for each vector graphic object. Instead, appropriate portions of the information produced during those procedures (114, 122) can be accessed or selected for each selected vector graphic object or color thereof after the location and color of the vector graphic object are determined (118, 126). For instance, once transformed colorant recipes are generated 130 for all of the original colorant recipes for which transformation is desired, the original colorant recipes may be replaced 136 with the transformed colorant recipes and the image, including the respective vector graphic object or objects, may be rendered 140 at the respective intended rendering location or locations and based on the transformed colorant recipe or recipes.

For instance, if due to spatial non-uniformity in a printer, the two vector graphic objects discussed earlier would, due to their different intended rendering locations (200, 600; 200, 100), be rendered to have a different color appearance, then an embodiment of the method 110 described above could be applied. Accordingly, when the page description language code discussed earlier is processed or interpreted, the spot color callout is replaced 136 by the corresponding transformed recipe. For example, the determined 122 location specific compensation information (e.g., respective ones of the estimated partial derivatives multiplied by determined deviations, or selected portions of a spatially dependent tone reproduction curve) may be such that M is transformed from 55% to 52% and Y is transformed from 70% to 71% at the intended rendering location corresponding to the centroid of the first rectangle (i.e., 250, 625), and M is transformed from 55% to 57% and Y is transformed from 70% to 73% at the intended rendering location corresponding to the centroid of the second rectangle (i.e., 250, 125) as depicted in the following snippet.

0 0.52 0.71 0 setcmykcolor
200 600 100 50 rectfill
0 0.57 0.73 0 setcmykcolor
200 100 100 50 rectfill The different colorant recipe values for the two locations are transformed or compensated versions of the original colorant recipe and compensate for spatial non-uniformity in the associated printer. Accordingly, the two rectangles would be rendered to appear to have the same color.

A system 410 associated with a rendering device 414 that is operative to provide directions for directing the rendering device 414 to render an image described in a page description language, the image description including at least one vector graphic object and wherein each vector graphic object is associated with a respective color, a respective original colorant recipe for emulating the respective color, wherein the system compensates for spatial variation in a color rendering performance of the associated rendering device can include a spatial variation information determiner 418, a spatial compensation information determiner 422 and a colorant recipe transformer 426. For instance, the system can include or be included in or comprise an image processing system. Such systems include, but are not limited to, document authoring tools, image authoring tools, desktop publishers, "digital front ends", photocopiers, facsimile transmission machines, multi-function devices, printers, displays and other devices.

For example, the spatial variation information determiner 418 can be operative to control the associated rendering device 414 to render a plurality of sets of test images, each respective set of test images being based on a respective test image colorant recipe and wherein each test image of a respective set of test images is rendered at a plurality of locations in image rendering space. Additionally, the spatial variation information determiner 418 can be operative to receive color measurement and location information regarding color measurements made of the test images at the plurality of locations associated with each test image. For example, the color measurements can be made using a color measurement sensor (e.g., 430). Additionally, the spatial variation information determiner 418 can be operative to process the received color measurement and location information to generate spatial variation information associated with rendering the color of at least a selected vector graphic object, of the at least one vector graphic object, with the associated rendering device.

The spatial compensation information determiner 422 can be operative to generate spatially dependent compensation information associated with rendering the color of the at least one vector graphic object for the associated rendering device based on the spatial variation information.

The colorant recipe transformer 426 can be operative to determine location specific compensation information for the intended rendering location of the selected vector graphic object from the spatially dependent compensation information and the intended rendering location. Additionally, the colorant recipe transformer 426 can be operative to generate a respective transformed colorant recipe from the respective original colorant recipe and the location specific compensation information. Additionally, the colorant recipe transformer 426 can be operative to replace the respective original colorant recipe of the at least one vector graphic object with the respective transformed colorant recipe, thereby transforming the colorant recipe.

Accordingly, the system 410 can be operative to perform embodiments of the method 110 described above. For instance, the spatial variation information determiner 418 can be operative to measure 114 spatial variation in the color rendering performance of the associated rendering device 414. For example, the spatial variation information determiner can be operative to control the associated rendering device 414 to print 214 test images according to an original colorant recipe determined 126 from the vector graphic object of an image 434 at a plurality of locations. In such embodiments, the spatial variation information determiner 418 can be operative to measure 218 colors of the test images using a color measurement device, such as the sensor 430. Alternatively, the spatial variation information determiner 418 can determine spatial variation information without prior knowledge of a color or original colorant recipe associated with the vector graphic object. For instance, test images can be printed based on a wide range of color emulation colorant recipes as discussed above.

The spatial variation information determiner 418 may also use the measurement information received from, for example, the sensor 430, to generate spatial variation information associated with the rendering device. For example, the spatial variation information determiner may compare measurements associated with a given location in image rendering space with a standard or expected value, thereby determining color deviations associated with each location and with each tested color. For instance, where a color is associated with a particular set of device independent color space parameter values, the spatial variation information determiner 418 may compare the measured values from each location to those standard values. In some embodiments, the measured values may be compared to a value calculated from the original colorant recipe processed through the system model. In still other embodiments, the measurement values for a color at a particular location may be compared to an average or other value derived from some or all of the measurements made of color patches associated with that color at some or all of the tested locations. These color differences or deviations may be provided to the spatial compensation information determiner 422 in association with their respective location information. The spatial compensation information determiner 422 may use these color differences or deviations to determine or generate spatially dependent compensation information.

For example, the spatial compensation information determiner 422 may estimate 318 partial derivatives of aspects of the color rendering performance of the associated rendering device 414. For instance, the spatial compensation information determiner may determine 314 a system model for the associated rendering device and exercise that model according to small perturbations of individual colorant amounts or area coverages from a particular colorant recipe. Exercising the system model in this way provides information describing changes in parameter values of a machine independent color space brought about by changes in colorant amounts. As described above, these ratios can be used to estimate 318 partial derivatives of aspects of the system model and can be arranged as depicted above in a Jacobian matrix. The Jacobian can be used to predict changes in colors generated by changes in colorant amounts. However, in order to compensate colorant recipes for spatial variation in a rendering device, what is required is a means for transforming deviations in color to changes in colorant amounts. Accordingly, in some embodiments, the spatial compensation information determiner 422 is operative to invert the Jacobian according to one or more of the methods described above. This inverted form of the Jacobian can be provided to the colorant recipe transformer 426. The colorant recipe transformer 426 can select aspects of the inverted Jacobian according to the intended rendering location of the vector graphic object or objects in the image 433 and according to their respective colors, thereby determining location specific compensation information and generate respective transformed colorant recipes from the original colorant recipe of the vector graphic objects and the determined location specific compensation information. For example, the color recipe transformer 426 can multiply 326 parameter values of the determined deviations 322 in color, determined by the spatial variation information determiner 418, by respective ones of the partial derivatives of the inverted Jacobian as described above, $$\begin{bmatrix} dc \\ dm \\ dy \\ dk \end{bmatrix} = S \cdot \begin{bmatrix} dL \\ da \\ db \end{bmatrix},$$

where S is the inverse of J.

Additionally, the colorant recipe transformer 426 can combine the resulting colorant differences or changes (e.g., dc, dm, dy, dk) with the parameters of the original colorant recipe thereby transforming the original colorant recipe into a transformed colorant recipe.

The colorant recipe transformer 426 may then replace the original colorant recipe with the transformed colorant recipe thereby transforming the color of at least the selected vector graphic object or objects of the image 434. This transformed version or portion of the image 434 may be stored in an image storage 438 (such as an image memory or storage device) or be passed on for further processing, such as rasterization or other processing leading toward rendering by the associated rendering device 414.

As indicated above, in some embodiments, instead of estimating partial derivatives by exercising the system model, partial derivatives are estimated 318 by exercising the rendering device 414. Accordingly, in some embodiments, the spatial compensation information determiner 442 is operative to control the associated rendering device 414 to render a plurality of test images based on test colorant recipes which are generated from respective perturbations of respective colorant amounts called for in colorant recipes. If compensation is determined on a job-by-job basis, the colorant recipes from which perturbations are made can be those of vector graphic objects described in the page description language. Alternatively, test images are rendered according to perturbations from a plurality of original colorant recipes. In either case, the plurality of test images are rendered at a plurality of locations in image rendering space so that for each original colorant recipe, and for each location, partial derivatives of aspects of the color rendering performance can be estimated 318. The spatial compensation information determiner 422 receives measurement information from the sensor 430 and location information regarding each measurement and uses that information to estimate 318 the partial derivatives for each location. Once the estimated partial derivatives are available, the colorant recipe transformer can proceed as described above 426. The colorant recipe transformer 426 receives color deviations determined by the spatial variation information determiner 418 and multiplies those deviations by appropriate ones of the estimated partial derivatives thereby determining 122 location specific compensation information (i.e., colorant changes). The colorant recipe transformer 426 combines the colorant changes with the original colorant recipe thereby generating a respective transformed colorant recipe and replaces the original colorant recipe with the transformed colorant recipe. This information may be stored in the image storage 438 or provided to further image processing systems and/or directly to the associated rendering device 414 for inclusion in a rendered image.

In some embodiments or applications, instead of using estimates of partial derivatives of the color rendering performance of the associated rendering device, the spatial compensation information determiner 422 generates a spatially dependent tone reproduction curve. For instance, the spatial compensation information determiner 422 controls the associated rendering device 414 to print a color strip or series of patches or test images in a plurality of locations. For instance, the strip or patches or test images include only a single colorant and are based on a particular area coverage or colorant amount (e.g., 50%). If variation is anticipated in only one direction (e.g., a cross process direction), then a test strip may be printed across a page. Test images or patches may be printed in either case. Furthermore, a plurality of test images or strips can be printed if variation is anticipated to occur in a plurality of directions. Similar test images are printed based on other area coverages or colorant amounts. Each image is presented to the sensor 430 and the color thereof is measured. Any sensor capable of measuring variation in the rendered test images may be used. For example, a densitometer may be used. In the case of electrophotographic or xerographic rendering devices, the sensor may be internal and take measurements on photo receptors or transfer belts or drums. Alternatively, measurements may be taken from images rendered on print media (e.g., paper, vellum, etc.). Alternatively, the sensor 430 may be a spectrophotometer.

The spatial compensation information determiner 422 receives measurements from the sensor 430 as well as location information and the requested area coverage or colorant value associated with each measurement. For each location, information regarding measurements associated with a plurality of area coverages or colorant amounts can be used to generate a location specific engine response curve from which a location specific compensating tone reproduction curve can be generated. The spatial compensation information determiner 422 may repeat this process for all the colorants (or display element colors) available to the rendering device 414. The generated set of spatially dependent tone reproduction curves constitutes the determined 122 location specific compensation information.

In such embodiments, the colorant recipe transformer processes the colorant or area coverage amounts called for in the original colorant recipe of the vector graphic object according to the information provided in the spatially dependent tone reproduction curves generated by the spatial compensation information determiner. Such processing provides new or compensated or transformed colorant or area coverage amounts for each colorant called for in the original colorant recipe, although this is not to say that the new or transformed colorant values are different for each colorant.

As before, the transformed colorant recipe replaces the original colorant recipe and may be included in a description of the image, or the vector object which may be stored in the image storage 438 for later use, passed on to other image processing elements, such as a rasterization process, of an associated image processing system or provided as input to the rendering device 414 which may use it in the production of rendered versions of the image.

The spatial variation information determiner 418, spatial compensation information determiner 422 and colorant recipe transformer 426 may be implemented in various combinations of software and hardware including, but not limited to, microcontrollers, microprocessors, digital signal processors, graphical processing units (GPU), computer memories, application specific integrated circuits (ASICs), field programmable gate arrays (FPGAs) and other devices.

It will be appreciated that various of the above-disclosed and other features and functions, or alternatives thereof, may be desirably combined into many other different systems, configurations or applications. Also that various presently unforeseen or unanticipated alternatives, modifications, variations or improvements therein may be subsequently made by those skilled in the art which are also intended to be encompassed by the following claims.

What is claimed is:

1. A method for rendering an image described in a page description language, the image description including at least one vector graphic object each vector object being associated with a respective color and a respective original colorant recipe for emulating the respective color, wherein the method compensates for spatial variation in a color rendering performance of an associated rendering device, the method comprising:

determining the original colorant recipe of at least one selected vector graphic object of the at least one vector object;

determining at least one respective intended rendering location in image rendering space of the at least one selected vector graphic object;

measuring the spatial variation in the color rendering performance of the associated rendering device related to rendering the color of the at least one selected vector graphic object, thereby generating spatial variation information associated with rendering the respective at least one respective color of the at least one selected vector graphic object;

determining respective location specific compensation information for the at least one respective intended rendering location from the spatial variation information and the at least one respective intended rendering location;

generating at least one respective transformed colorant recipe from the at least one respective original colorant recipe and the at least one respective location specific compensation information;

replacing the respective original colorant recipe of the at least one selected vector graphic object with the at least one respective transformed colorant recipe; and rendering the image including the at least one selected vector graphic object and the associated at least one respective transformed colorant recipe at the at least one respective intended rendering location using the associated rendering device.

2. The method of claim 1 wherein measuring the spatial variation in the color rendering performance of the associated rendering device related to rendering the color of the selected vector graphic object, thereby generating spatial variation information associated with rendering the color of the selected vector graphic object comprises:

rendering test images based on the original colorant recipe at a plurality of locations in image rendering space; and, measuring colors of the test images using a color measurement device; thereby generating measured colors associated with the plurality of locations, which comprise the spatial variation information.

3. The method of claim 2 wherein determining respective location specific compensation information for the at least one respective intended rendering location from the spatial variation information and the at least one respective intended rendering location comprises:

determining a system model for the associated rendering device, wherein the system model relates colorant recipes to values in a device independent color space according to a sampled operation of the rendering device;

estimating partial derivatives of aspects of the system model, the partial derivatives being obtained through a use of the system model at and/or near a point in the machine dependent color space associated with the at least one respective original colorant recipe, wherein the estimated partial derivatives describe changes in respective colorant amounts required to produce related changes in parameter values of the machine independent color space, according to the sampled operation of the rendering device;

determining deviations in the color rendering performance of the associated rendering device, in terms of the machine independent color space, from a performance predicted by the system model based on the sampled operation and the measured colors at the plurality of locations in image rendering space; and multiplying parameter values of the determined deviations by respective ones of the partial derivatives, thereby transforming the determined deviations into colorant recipe differences associated with the plurality of locations.

4. The method of claim 3 wherein determining respective location specific compensation information for the at least one respective intended rendering location from the spatial variation information and the at least one respective intended rendering location comprises one of:

selecting at least one respective colorant recipe difference associated with at least one respective location of the plurality of locations that is closest to the intended respective at least one rendering location of the at least one selected vector graphic object to be the location specific compensation information, and interpolating between colorant recipe differences associated with respective locations of the plurality of locations that neighbor the respective at least one intended rendering location of the selected vector graphic object, thereby determining the location specific compensation information.

5. The method of claim 4 wherein generating the at least one transformed colorant recipe from the at least one respective original colorant recipe and the respective location specific compensation information comprises:

combining values of the at least one respective original colorant recipe with respective values of the respective location specific compensation information, thereby generating the at least one transformed colorant recipe.

6. The method of claim 2 wherein determining respective location specific compensation information for the at least one respective intended rendering location from the spatial variation information and the at least one respective intended rendering location comprises:

rendering a plurality of test images with the associated rendering device based on test colorant recipes, the test colorant recipes being generated from respective perturbations of respective colorant amounts called for in respective original colorant recipe, the plurality of test images being rendered at at least one selected location in image rendering space, the at least one location including locations known or later determined to be at and/or near or adjacent to the respective at least one intended location of the at least one selected vector graphic object; and, measuring perturbation colors of the plurality of test images using a color measurement device, thereby generating a plurality of measured perturbation colors associated with the plurality of locations, which comprise the spatial variation information;

estimating partial derivatives of the performance of the associated rendering device for the color of the at least one selected vector graphic object at the at least one selected location, the partial derivatives being obtained from comparisons between respective combinations of color measurements associated with at least some of the at least one selected location, the respective combinations of color measurements being selected from the measured colors of the spatial variation information and respective ones of the measured perturbation colors, wherein the estimated partial derivatives describe changes in respective colorant amounts required to produce related changes in parameter values of the machine independent color space;

determining at least one deviation in the color rendering performance of the associated rendering device, in terms of the machine independent color space, from a performance predicted by a system model and the respective measured colors at the at least one selected location in image rendering space; and multiplying parameter values of the at least one determined deviation by respective ones of at least one respective selected set of estimated partial derivatives, thereby transforming the at least one determined deviation into a respective at least one colorant recipe difference associated with the at least one selected location.

7. The method of claim 6 wherein determining respective location specific compensation information for the at least one respective intended rendering location from the spatial variation information and the at least one respective intended rendering location comprises one of:

selecting at least one respective colorant recipe difference associated with at least one respective location of the at least one selected location that is closest to the respective at least one intended rendering location of the at least one selected vector graphic object to be the respective location specific compensation information, and interpolating between colorant recipe differences associated with respective sets of locations of the at least one selected location that neighbor the respective at least one intended rendering location of the at least one selected vector graphic object, thereby determining the location specific compensation information.

8. The method of claim 7 wherein generating the at least one respective transformed colorant recipe from the at least one respective original colorant recipe and the respective location specific compensation information comprises:

combining values of the at least one respective original colorant recipe with respective values of the respective location specific compensation information, thereby generating the at least one respective transformed colorant recipe.

9. The method of claim 1 wherein measuring the spatial variation in the color rendering performance of the associated rendering device related to rendering the color of the at least one selected vector graphic object, thereby generating spatial variation information associated with rendering the respective at least one respective color of the at least one selected vector graphic object comprises:
for each colorant separation associated with the respective original colorant recipe of the at least one selected vector graphic object:
rendering test images based on selected set of area coverage values, test images based on each selected area coverage value being rendered at a plurality of locations in image rendering space; and,
measuring colors of the test images using a sensing device; thereby generating measured colors associated with the plurality of locations, which comprise the spatial variation information.

10. The method of claim 9 wherein determining respective location specific compensation information for the at least one respective intended rendering location from the spatial variation information and the at least one respective intended rendering location comprises:
for each colorant separation associated with any respective original colorant recipe of the at least one selected vector graphic object:
building a spatially dependent tone reproduction curve based on the spatial variation information, thereby generating the spatially dependent compensation information.

11. A method for rendering an image described in a page description language, the image description including at least one vector graphic object each vector object being associated with a respective color and a respective original colorant recipe for emulating the respective color, wherein the method compensates for spatial variation in a color rendering performance of an associated rendering device, the method comprising:
determining the original colorant recipe of at least one selected vector graphic object of the at least one vector object;
determining at least one respective intended rendering location in image rendering space of the at least one selected vector graphic object;
measuring the spatial variation in the color rendering performance of the associated rendering device related to rendering the color of the at least one selected vector graphic object, thereby generating spatial variation information associated with rendering the respective at least one respective color of the at least one selected vector graphic object;
estimating partial derivatives of aspects of the color rendering performance of the associated rendering device, the partial derivatives being estimated at least for points in the machine independent color space that are known or later determined to be at and/or near the intended rendering location, wherein the estimated partial derivatives describe changes in respective colorant amounts required to produce related changes in parameter values of the machine independent color space;
determining deviations in the color rendering performance of the associated rendering device at a plurality of locations at and/or near the intended rendering location, in terms of the machine independent color space from the spatial variation information; and
multiplying parameter values of the determined deviations by respective ones of the partial derivatives, thereby transforming the determined deviations into colorant recipe differences associated with the plurality of locations;
generating at least one respective transformed colorant recipe from the at least one respective original colorant recipe and colorant recipe differences associated with the plurality of locations;
replacing the respective original colorant recipe of the at least one selected vector graphic object with the at least one respective transformed colorant recipe; and
rendering the image including the at least one selected vector graphic object and the associated at least one respective transformed colorant recipe at the at least one respective intended rendering location using the associated rendering device.

12. The method of claim 11 wherein estimating partial derivatives of aspects of the color rendering performance comprises:
determining a system model for the associated rendering device, wherein the system model relates colorant recipes to values in a device independent color space according to a sampled operation of the rendering device; and
estimating partial derivatives of aspects of the system model, the partial derivatives being obtained through a use of the system model at a plurality of points at and/or near a point in the machine dependent color space associated with the at least one respective original colorant recipe, wherein the estimated partial derivatives describe changes in respective colorant amounts required to produce related changes in parameter values of the machine independent color space, according to the sampled operation of the rendering device.

13. The method of claim 11 wherein estimating partial derivatives of aspects of the color rendering performance comprises:
rendering a plurality of test images with the associated rendering device based on test colorant recipes the test colorant recipes being generated from respective perturbations of respective colorant amounts called for in respective original colorant recipe, the plurality of test images being rendered at at least one selected location in image rendering space, the at least one location including locations known or later determined to be at and/or adjacent to the respective at least one intended location of the at least one selected vector graphic object; and,
measuring perturbation colors of the plurality of test images using a color measurement device, thereby generating a plurality of measured perturbation colors associated with the plurality of locations, which comprise the spatial variation information;
estimating partial derivatives of the performance of the associated rendering device for the color of the at least one selected vector graphic object at the at least one selected location, the partial derivatives being obtained from comparisons between respective combinations of color measurements associated with at least some of the at least one selected location, the respective combinations of color measurements being selected from the measured colors of the spatial variation information and respective ones of the measured perturbation colors, wherein the estimated partial derivatives describe changes in respective colorant amounts required to produce related changes in parameter values of the machine independent color space.

14. The method of claim 13 wherein test images for measuring the spatial variation and the plurality of test images based on the test colorant recipes generated from respective perturbations of respective colorant amounts called for in respective original colorant are rendered and measured contemporaneously.

15. The method of claim 11 wherein generating at least one respective transformed colorant recipe from the at least one respective original colorant recipe and colorant recipe differences associated with the plurality of locations comprises one of:
selecting at least one respective colorant recipe difference associated with at least one respective location of the plurality of locations that is closest to the intended respective at least one rendering location of the at least one selected vector graphic object to be the location specific compensation information, and
interpolating between colorant recipe differences associated with respective locations of the plurality of locations that neighbor the respective at least one intended rendering location of the selected vector graphic object, thereby determining the location specific compensation information, thereby determining the colorant recipe differences associated with the plurality of locations from which the at least one respective transformed colorant recipe is generated.

16. The method of claim 11 wherein estimating the partial derivatives comprises:
processing a plurality of changes from the original colorant recipe, thereby generating respective sets of values for parameters in the device independent color space attributable to the plurality of changes, wherein the changes comprise, for each colorant included in the original colorant recipe, varying the colorant amount from the amount of the colorant called for in the original colorant recipe while holding amounts of the other colorants to be the same as called for in the spot color emulation colorant recipe;
determining changes in the parameter values in the device independent color space caused by the changes from the spot color emulation colorant recipe;
defining a Jacobian matrix based on the determined changes wherein each element of the matrix describes a respective partial derivative of a parameter in the device independent color space with respect to a respective colorant for which a colorant amount is specified in the initial spot color emulation colorant recipe; and
inverting the Jacobian matrix, wherein the inversion provides the estimate of the partial derivatives.

17. The method of claim 16 wherein processing a plurality of changes comprises at least one of:
rendering a plurality of test images with the associated rendering device based on test colorant recipes the test colorant recipes being generated from respective perturbations of respective colorant amounts called for in respective original colorant recipe, the plurality of test images being rendered at at least one selected location in image rendering space, the at least one location including locations known or later determined to be at and/or adjacent to the respective at least one intended location of the at least one selected vector graphic object, and measuring perturbation colors of the plurality of test images using a color measurement device, thereby generating a plurality of measured perturbation colors associated with the plurality of locations, which comprise the spatial variation information; and
determining a system model for the associated rendering device, wherein the system model relates colorant recipes to values in a device independent color space according to a sampled operation of the rendering device and processing the plurality of changes through the system model.

18. An image processing system associated with a rendering device, the image processing system being operative to provide directions for directing the rendering device to render an image described in a page description language, the image description including at least one vector graphic object, each vector graphic object being associated with a respective color and a respective original colorant recipe for emulating the respective color, wherein the system compensates for spatial variation in a color rendering performance of the associated rendering device, the system comprising:
a spatial variation information determiner that is operative to control the associated rendering device to render a plurality of sets of test images, each respective set of test images being based on a respective test image colorant recipe, each test image of a respective set of test images being rendered at a plurality of locations in image rendering space, and is operative to receive color measurements and location information regarding color measurements made of the test images at the plurality of locations associated with each set of test images, the color measurements being made using a color measurement sensor, and is operative to process the received color measurement and location information to generate spatial variation information associated with rendering the color of at least a selected vector graphic object, of the at least one vector graphic object, with the associated rendering device;
a spatial compensation information determiner that is operative to generate spatially dependent compensation information associated with rendering the color of the at least one vector graphic object for the associated rendering device based on the spatial variation information associated with rendering the color of the at least one vector graphic object; and
a colorant recipe transformer that is operative to determine location specific compensation information for the intended rendering location from the spatially dependent compensation information and the intended rendering location, is operative to generate a respective transformed colorant recipe from the respective original colorant recipe and the location specific compensation information and is operative to replace the respective original colorant recipe of the at least one vector graphic object with the respective transformed colorant recipe, thereby transforming the page description language file.

19. The system of claim 18 wherein the spatial compensation information determiner is operative to generate spatially dependent compensation information by estimating partial derivatives of aspects of the color rendering performance of the associated rendering device, the partial derivatives being estimated at least for points in the machine independent color space that are known or later determined to be at and/or near the intended rendering location, wherein the estimated partial derivatives describe changes in respective colorant amounts required to produce related changes in parameter values of the machine independent color space, determine deviations in the color rendering performance of the associated rendering device at and/or near the intended rendering location, in terms of the machine independent color space from the spatial variation information, and multiply parameter values of the determined deviations by respective ones of the partial derivatives, thereby transforming the determined deviations into colorant recipe differences associated with the plurality of locations.

20. The system of claim 18 wherein the spatial compensation information determiner is operative to generate spatially dependent compensation information by:
   for each colorant separation associated with any respective original colorant recipe of the at least one selected vector graphic object:
   building a spatially dependent tone reproduction curve based on the spatial variation information, thereby generating the spatially dependent compensation information.

* * * * *